United States Patent [19]

Fujiwara et al.

[11] Patent Number: 5,378,781
[45] Date of Patent: Jan. 3, 1995

[54] PROCESS FOR PRODUCING HIGH-QUALITY VINYL CHLORIDE POLYMERS USING A PERESTER OR PERCARBONATE AND 1-CYCLOHEXYL-1-METHYLETHYL PEROXYNEODECANOATE

[75] Inventors: Makoto Fujiwara; Tadashi Amano, both of Ibaraki, Japan

[73] Assignee: Shin-Etsu Chemical Co., Ltd., Tokyo, Japan

[21] Appl. No.: 74,520

[22] Filed: Jun. 11, 1993

[30] Foreign Application Priority Data

Jun. 11, 1992 [JP] Japan .................................. 4-177466

[51] Int. Cl.$^6$ ............................ C08F 4/38; C08F 2/20
[52] U.S. Cl. ................................. 526/228; 526/344.2
[58] Field of Search ........................................ 526/228

[56] References Cited

U.S. PATENT DOCUMENTS 3,687,867 8/1972 Lewis .
4,914,169 4/1990 Suyama .

*Primary Examiner*—Christopher Henderson
*Attorney, Agent, or Firm*—Lowe, Price, LeBlanc & Becker

[57] ABSTRACT

A process for producing a vinyl chloride polymer comprises subjecting a vinyl chloride monomer or a mixture comprising a major proportion of a vinyl chloride monomer along with at least one co-polymerizable monomer to suspension polymerization in an aqueous medium in the presence of a monomer-soluble polymerization initiator. The monomer-soluble polymerization initiator comprises, in combination, (A) a compound which is free of a benzene ring, a cyclohexyl group and an alkoxy group in the molecule and whose 10 hours half-life temperature at a concentration of 0.1 mole/liter of benzene is in the range of 30° to 50° C. and (B) 1-cyclohexyl-1-methylethyl peroxyneodecanoate.

8 Claims, No Drawings

PROCESS FOR PRODUCING HIGH-QUALITY VINYL CHLORIDE POLYMERS USING A PERESTER OR PERCARBONATE AND 1-CYCLOHEXYL-1-METHYLETHYL PEROXYNEODECANOATE

BACKGROUND OF THE INVENTION

1. Field of the Invention

This invention relates to the production of vinyl chloride polymers and more particularly, to a process for producing high-quality vinyl chloride polymers with high production efficiency.

2. Description of the Prior Art

In general, vinyl chloride polymers are produced by suspension polymerization of vinyl chloride monomer or mixtures comprising a major proportion of vinyl chloride monomer in an aqueous medium by use of monomer-soluble polymerization initiators. The monomer-soluble polymerization initiators used for this purpose greatly influence, depending on the type of initiator, the quality characteristics such as the exothermic pattern of the polymerization reaction, the polymerization time, the productivity, the scale deposit during polymerization, the initial coloration of polymer, the thermal stability, the odor, the non-extractability and the like.

In order to improve the productivity of vinyl chloride polymers, a recent trend is to shorten the polymerization time, with the tendency that polymerization initiators are now used in increasing amounts. As the amount of initiator is increased, there arise many problems including not only the limitation accompanied by the shortage in cooling capacity of overall existing polymerization apparatus, but also the initial coloration of polymer, the lowering of thermal stability, the generation of offensive odor owing to the increase in amount of the residue or decomposed product of polymerization initiator and the increase in amount of extracted components. In addition, the scale deposit within a polymerization vessel is also undesirably increased in amount.

SUMMARY OF THE INVENTION

It is therefore an object of the invention to provide a process for producing vinyl chloride polymers which can solve not only the problems involved by shortage in cooling capacity of existing polymerization apparatus, but also the problem of the adverse influence on the quality of vinyl chloride polymers.

It is another object of the invention to provide a process for producing vinyl chloride polymers whereby the scale deposit in polymerization vessels can be suppressed to a significant extent.

The above objects can be achieved, according to the invention, by a process for producing vinyl chloride polymers which comprises subjecting a vinyl chloride monomer or a mixture comprising a major proportion of a vinyl chloride monomer along with at least one co-polymerizable monomer to suspension polymerization in an aqueous medium in the presence of a monomer-soluble polymerization initiator, the monomer-soluble polymerization initiator comprising, in combination, (A) a compound which is free of a benzene ring, a cyclohexyl group and an alkoxy group in the molecule and whose 10 hours half-life temperature at a concentration of 0.1 mole/liter of benzene is in the range of 30° to 50° C. and (B) 1-cyclohexyl-1-methylethyl peroxyneodecanoate. Thus, the present invention is characterized by carrying out the suspension polymerization by use of a combination of (A) a compound which is free of a benzene ring, a cyclohexyl group and an alkoxy group and which has a specifically defined half-life period of the activity and (B) 1-cyclohexyl-1-methylethyl peroxyneodecanoate. It will be noted here that the term "10 hours half-life temperature" is intended to mean a temperature at which the compound is reduced to in amount a half in 10 hours.

DETAILED DESCRIPTION AND EMBODIMENTS OF THE INVENTION

In the practice of the invention, the suspension polymerization of a vinyl chloride monomer or its mixture with at least one co-polymerizable monomer is effected according to known procedures except that a monomer-soluble polymerization initiator is made of two types of compounds set out hereinabove.

Reference is now made to the monomer-soluble polymerization initiator which comprises two ingredients (A) and (B).

The ingredient (A) should be a compound which is free of any benzene ring, cyclohexyl group and alkoxy group in the molecule. For instance, when a compound having a benzene ring in the molecule is used, the resulting vinyl chloride polymers exhibit a UV absorption peak when subjected to an extraction test, placing some limitation in the fields of medical service and foods. Likewise, when a cyclohexyl group is contained in the molecule, there arises the problem that the slurry viscosity in a final stage of the polymerization process undesirably increases. Thus, the heat of the polymerization reaction is unlikely to be removed in an efficient manner, resulting in the productivity not being enhanced. If an alkoxy group is present in the molecule, scale deposition undesirably becomes very great in amount.

When the concentration of the ingredient (A) in benzene is 0.1 mole/liter, the ingredient (A) should have a 10 hours half-life temperature ranging from 30° to 50° C. If the temperature is lower than 30° C., the continuity of the activity is undesirably lowered. When the temperature is higher than 50° C., the initiator is required in excess. In either case, the resultant vinyl chloride polymer is degraded with respect to the quality characteristics such as initial coloration, non-extractability and the like.

The compound used as the ingredient (A) which can satisfies the above requirements is, for example, a perester compound of the following general formula (1)

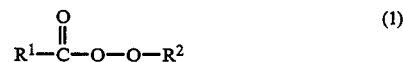

wherein $R^1$ and $R^2$, respectively, represent a substituted or unsubstituted n-alkyl group, sec-alkyl group, tert-alkyl group or cyclic alkyl group, except for a cyclohexyl group, having from 1 to 20 carbon atoms, preferably from 3 to 15 carbon atoms. Typical examples include t-hexyl peroxyneodecanoate (45° C.), t-butyl peroxyneodecanoate (46° C.), t-hexyl peroxyneohexanoate (49° C.), 2,4,4-trimethylpentyl peroxyneodecanoate (36° C.) and the like.

Alternatively, the compound may be a percarbonate of the following general formula (2)

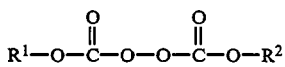

wherein $R^1$ and $R^2$ have, respectively, the same meanings as defined above. Typical examples of the percarbonate include diisopropyl peroxydicarbonate (41° C.), di-n-propyl peroxydicarbonate (41° C.), di-2-ethylhexyl peroxydicarbonate (41° C.), di-2-ethylhexyl peroxydicarbonate (43° C.) and the like.

These peresters and percarbonates may be used on their own or in combination thereof. It will be noted that the values in parentheses indicated after the individual compounds mean a 10 hours half-life temperature. Of those compounds indicated above, there are preferably used the perester compounds including t-hexyl peroxyneodecanoate, t-butyl peroxyneodecanoate and t-hexyl peroxyneohexanoate.

The ingredient (B) which is used in combination with the ingredient (A) of the polymerization inhibitor is 1-cyclohexyl-1-methylethyl peroxyneodecanoate of the following formula (3)

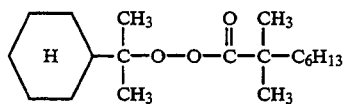

This ingredient (B) serves to control the reactivity of the ingredient (A), so that the resultant vinyl chloride polymer has a controlled quality.

In the practice of the invention, the ingredients (A) and (B) are preferably used at a mixing ratio by weight of 9:1 to 1:9, more preferably 9:1 to 3:7 although, more or less, depending on reaction conditions. If the ingredient (A) is used in larger amounts, the resultant vinyl chloride polymer is not appreciably improved in the initial coloration and the thermal stability. On the contrary, if the ingredient (B) is used in larger amounts, it becomes difficult to appropriately suppress scale deposition. The total amount of the ingredients (A) and (B) is preferably in the range of 0.03 to 0.7 wt % based on the monomer. This is true especially of the case where a vinyl chloride homopolymer having, for example, an average degree of polymerization of 1000 is prepared.

These ingredients may be added to the polymerization system, after dilution in an appropriate solvent or after formation of an emulsion or suspension by dispersion in water, along with or after charging of water and/or a suspending agent. Alternatively, the ingredients may be forced into a reactor by means of a pump after vinyl chloride monomer and co-polymerizable monomers have been charged thereinto.

The starting monomers used in the present invention include not only vinyl chloride alone, but also mixtures of vinyl chloride with at least one comonomer wherein it is preferred that vinyl chloride monomer is present in amounts not less than 50 wt %. The comonomers used in the mixtures include, for example, α-olefins such as ethylene, propylene, 1-butene, 1-pentene, 1-hexene, 1-heptene, 1-octene, 1-nonene, 1-decene, 1-undecene, 1-dodecene, 1-tridecene, 1-tetradecene and the like, acrylic acid and acrylates such as methyl acrylate, ethyl acrylate and the like, methacrylic acid and methacrylates such as methyl methacrylate, maleic acid and esters thereof, vinyl esters such as vinyl acetate, vinyl propionate and the like, vinyl ethers such as lauryl vinyl ether, isobutyl vinyl ether and the like, maleic anhydride, acrylonitrile, styrene, vinylidene chloride, and other monomers copolymerizable With vinyl chloride. These comonomers may be used singly or in combination if mixtures are used.

For the suspension polymerization in an aqueous medium, dispersion aids which are ordinarily employed for polymerization of vinyl chloride monomer may be used as usual. Examples of the aids include: water-soluble cellulose ethers such as methyl cellulose, hydroxyethyl cellulose, hydroxypropyl cellulose, hydroxypropylmethyl cellulose and the like; water or oil-soluble partially saponified polyvinyl alcohol; acrylic acid polymers; water-soluble polymers such as gelatin; oil-soluble emulsifiers such as sorbitan monolaurate, sorbitan trioleate, glycerine tristearate, ethylene oxide propylene oxide block copolymers and the like; and water-soluble emulsifiers such as polyoxyethylene sorbitan monolaurate, polyoxyethylene glycerin oleate, sodium laurate and the like. These may be used singly or in combination. The aqueous medium used may be deionized water.

The suspension polymerization can be conducted by any known manner except that the combination of the two types of monomer-soluble polymerization initiator ingredients (A) and (B) are used. For instance, the common practice of the polymerization of vinyl chloride monomer or monomers is utilizable with respect to the manner and ratios of charging an aqueous medium or water, vinyl chloride monomer or its mixture with at least one comonomer, and a dispersion aid. In the practice of the invention, since the two types of polymerization initiator ingredients are used, the suspension polymerization is preferably effected at a temperature of from 35° to 60° C. for a time of from 2 to 6 hours. If necessary, the polymerization system may further comprise additives which are ordinarily used for the polymerization of vinyl chloride monomer or its mixture with comonomers in amounts not impeding the polymerization reaction as is known in the art. Examples of such additives include polymerization regulators, chain transfer agents, pH adjustors, gelation modifiers, antistatic agents, crosslinking agents, stabilizers, fillers, antioxidants, buffers, scale inhibitors and the like.

The present invention is more particularly described by way of examples. Comparative examples are also described.

EXAMPLE 1 AND COMPARATIVE EXAMPLES 1, 2

890 kg of deionized water and 350 g of partially saponified polyvinyl alcohol were mixed to give an aqueous solution, followed by charging into a stainless steel polymerization vessel with an internal volume of 2.1 m³. The vessel was degassed to a reduced pressure of 50 mmHg, after which 700 kg of vinyl chloride monomer was charged thereinto. While agitating, polymerization initiators which are shown in Table 1 with respect to the types and the amounts were, respectively, forced into the vessel by means of a pump, whereupon the polymerization system was heated to commence the polymerization.

While keeping the temperature at 55° C., the polymerization reaction was effected, followed by stopping the reaction at the time when the inner pressure in the vessel reached 6.0 kg/cm² to collect unreacted monomer or monomers. The resultant polymers were each withdrawn to outside in the form of a slurry, followed by dehydration and drying to obtain a polymer sample for subsequent tests. The results of the tests are shown in Table 1.

It will be noted that in Comparative Example 2, the temperature of the jacket reached a temperature of the cooling water two hours after the commencement of the polymerization, so that the temperature in the vessel was increased by 3° C.

The tests on the scale deposit in the polymerization vessel, bulk density, size distribution, quantity of fish eyes, UV absorption and consumption of potassium permanganate, and initial coloration were, respectively, conducted according to the following procedures.

Scale deposition in the polymerization vessel:

The degree of the scale deposition was assessed according to the following standards.

Excellent: metallic mirror surface having a good metallic luster without deposition of any scale Good: metallic mirror surface which has a slight degree of cloudiness Fair: scale deposited on part of the metal surface Poor: film-shaped scales over the entire metal surface of the vessel Measurement of bulk density:

The respective polymers obtained were subjected to measurement according to the method described in JIS K-6721.

Measurement of Size Distribution:

The respective polymers were subjected to screening using #60, #100 and #200 sieves described in JIS Z-8801, and particles passing through the respective sieves were weighed and expressed by percent by weight.

Measurement of Fish eyes:

100 parts of each of the obtained polymers, 50 parts by weight of dioctyl phthalate, 0.1 part by weight of barium stearate, 0.1 part by weight of cadmium stearate, 0.8 parts by weight of cetanol, 2.0 parts by weight of a tin stabilizer, 0.5 parts by weight of titanium dioxide and 0.1 part of carbon black were mixed and kneaded by means of rolls with a diameter of 6 inches at 140° C. for five minutes to obtain a 0.3 mm thick sheet. The number of whitish transparent particles per 100 cm$^2$ of the sheet were counted.

Extraction Test:

15 g of each of the polymers was placed in an extraction bottle along with 300 ml of distilled water. The extraction bottle was placed in a sterilizer, followed by allowing to stand at 125° C. for 60 minutes. After cooling, the extraction bottle was removed from the sterilizer. The resultant supernatant liquid was subjected to measurements of UV absorption and a consumption of potassium permanganate. Moreover, distilled water alone was provided as a reference sample.

UV absorption: Absorbances at 220 nm and 241 nm were measured. When the difference in the absorbance from the absorbance of the reference sample was not smaller than 0.08 for 220 nm and not smaller than 0.05 for 241 nm, the UV absorption was evaluated as bad. Otherwise, the UV absorbance was evaluated as good.

Consumption of potassium permanganate:

After addition of potassium permanganate to the supernatant liquid, it was titrated with sodium thiosulfate. When the difference from the value of the reference sample was not smaller than 1.00 cc, the consumption was evaluated as bad. If the difference is smaller than 1.00 cc, the consumption was evaluated as good.

The great differences from the reference values with respect to the UV absorption and the consumption of potassium permanganate mean that such polymers are difficult to use as a resin for medical service.

Initial Coloration:

100 parts by weight of the polymer was formulated with 1 part by weight of tin laurate, 0.5 parts by weight of a cadmium stabilizer and 50 parts by weight of dioctyl phthalate, followed by kneading by means of a two-roll mill at 160° C. for 5 minutes and forming into a 0.8 mm thick sheet. The sheet was cut into pieces, which were put one on another and placed in a 4 cm×4 cm×1.5 cm (in thickness) mold, followed by compressing at 160° C. at 65 to 70 kgf/cm$^2$ to obtain a sample. The samples obtained in this manner were visually observed and assessed according to the following standards.

Good: coloration with the same degree of that of Example 1

Fair: more yellowish than in Example 1

TABLE 1

|  | Ex. 1 | Comp. Ex. 1 | Comp. Ex. 2 |
| --- | --- | --- | --- |
| Type and Amount (based on monomer) of Initiator | BPD/0.216% CMPD/0.054% | BPD/0.216% CPD/0.054% | BPD/0.27% |
| Polymerization Conditions: |  |  |  |
| minimum jacket temperature | 26.4° C. | 26.0° C. | 25.0° C. |
| polymerization time | 2 hours & 30 minutes | 2 hours & 25 minutes | 2 hours & 40 minutes |
| scale deposition | Good | Good | Good |
| Quality of Polymer: |  |  |  |
| bulk density | 0.532 | 0.526 | 0.535 |
| size distribution (pass %) |  |  |  |
| #60 | 100 | 100 | 100 |
| #100 | 40.8 | 56.2 | 62.1 |
| #200 | 0.7 | 0.9 | 1.0 |
| fish eyes | 12 | 16 | 40 |
| Extraction Test: |  |  |  |
| UV absorption | Good | Bad | Good |
| consumption of KMnO$_4$ | Good | Bad | Good |
| Initial Coloration: | Good | Fair | Fair |

Abbreviations for the polymerization initiators in the above table have the following meanings, respectively.
BPD: t-butyl peroxyneodecanoate (46° C.)
CPD: α-cumyl peroxyneodecanoate (36° C.)
CMPD: 1-cyclohexyl-1-methylethyl peroxyneodecanoate (41° C.)

EXAMPLES 2 TO 4 AND COMPARATIVE EXAMPLES 3 TO 6

An aqueous solution of 760 g of partially saponified polyvinyl alcohol in 930 kg of deionized water was charged into a stainless steel polymerization vessel with an internal volume of 2.1 m$^3$. The vessel was degassed to 50 mmHg, into which 630 kg of vinyl chloride monomer was charged. While agitating, polymerization initiators were forced into the vessel by means of a pump. The types and amounts of initiators are shown in Table 2. At the same time, the polymerization system was heated to commence the polymerization.

While the polymerization temperature was kept at 51° C., the polymerization reaction was effected. When the inner pressure of the vessel reached 6.0 kg/cm$^2$G, the polymerization was stopped and unreacted monomer was collected. The resultant polymer was withdrawn to outside in the form of a slurry, followed by dehydration and subjecting to the tests in the same manner as in Example 1. The results are shown in Table 2.

It will be noted that in Comparative Example 3, the jacket temperature arrived at a cooling water temperature 3 hours and 30 minutes after the commencement of the polymerization, the temperature in the vessel was increased by 1.5° C.

TABLE 2-1

|  | Ex. 2 | Ex. 3 | Ex. 4 |
|---|---|---|---|
| Type and Amount (based on monomer) of Initiator | BPD/0.0675% CMPD/0.0225% | TPPD/0.03% CMPD/0.06% | BPD/0.06% CMPD/0.06% |
| Polymerization Conditions: | | | |
| minimum jacket temperature | 31.8° C. | 30.0° C. | 26.7° C. |
| polymerization time | 4 hours & 40 minutes | 4 hours & 30 minutes | 3 hours 30 minutes |
| scale deposition in the vessel | excellent | excellent | excellent |
| Quality of Polymer | | | |
| bulk density | 0.481 | 0.483 | 0.488 |
| size distribution (pass %) | | | |
| #60 | 100 | 100 | 100 |
| #100 | 48.2 | 60.2 | 45.6 |
| #200 | 0.6 | 0.7 | 0.5 |
| fish eyes | 8 | 12 | 10 |
| Extraction Test: | | | |
| UV absorption | Good | Good | Good |
| Consumption of KMnO$_4$ | Good | Good | Good |
| Initial Coloration | Good | Good | Good |

Abbreviations for the polymerization initiators in Tables 2-1 and 2-2 have the following meanings, respectively.
BPD: t-butyl peroxyneodecanoate (46° C.)
TPPD: 2,4,4,-trimethylpentyl peroxy-2-neodecanoate (36° C.)
CPD: α-cumyl peroxyneodecanoate (36° C.)
DEPD: di-(2-ethoxyethyl) peroxydicarbonate (43° C.)
CMPD: 1-cyclohexyl-1-methylethyl peroxyneodecanoate (41° C.)

TABLE 2-2

|  | Comp. Ex. 3 | Comp. Ex. 4 | Comp. Ex. 5 | Comp. Ex. 6 |
|---|---|---|---|---|
| Type and Amount (based on monomer) of Initiator: | BPD/0.15% | BPD/0.09% CPD/0.03% | BPD/0.09% TPPD/0.03% | DEPD/0.0675% CMPD/0.0225% |
| Polymerization Conditions: | | | | |
| minimum jacket temperature | 26.0° C. | 28.0° C. | 28.5° C. | 32.5° C. |
| polymerization time | 4 hours & 10 minutes | 3 hours & 50 minutes | 3 hours & 50 minutes | 4 hours & 35 minutes |
| scale deposition in the vessel | excellent | good | good | bad |
| Quality of Polymer: | | | | |
| bulk density | 0.482 | 0.501 | 0.495 | 0.486 |
| size distribution (pass %) | | | | |
| #60 | 100 | 100 | 100 | 100 |
| #100 | 62.3 | 45.6 | 50.2 | 32.1 |
| #200 | 0.6 | 0.9 | 1.0 | 0.7 |
| fish eyes | 30 | 45 | 43 | 58 |
| Extraction Test: | | | | |
| UV absorption | Good | Bad | Good | Good |
| Consumption of KMnO$_4$ | Good | Bad | Good | Good |
| Initial Coloration | Fair | Good | Good | Fair |

As will be apparent from the foregoing examples, when two specific types of polymerization initiators are used in combination, there can be obtained vinyl chloride polymers which are improved in the characteristic properties such as the initial coloration, the thermal stability and the like without suffering any limitation accompanied by the shortage in cooling capacity of the polymerization apparatus. In addition, the scale deposition in the vessel can be effectively avoided.

What is claimed is:

1. In a process for producing a vinyl chloride polymer which comprises a vinyl chloride monomer or a mixture comprising a major proportion of a vinyl chloride monomer with at least one co-polymerizable monomer to suspension polymerization in an aqueous medium in the presence of a monomer-soluble polymerization initiator, the improvement characterized in that said monomer-soluble polymerization initiator consists essentially of a combination of:

(A) a compound selected from the group consisting of:
 i) peresters of the following formula

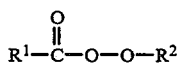

wherein R$^1$ and R$^2$, respectively, represent a n-alkyl group, sec-alkyl group, tert-alkyl group or cyclic alkyl group except for a cyclohexyl group, having from 1 to 20 carbon atoms; and
 ii) percarbonates of the following formula

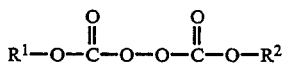

wherein $R^1$ and $R^2$ have, respectively, the same meanings as defined above, and mixtures thereof;

the compound (A) having a 10 hour half-life at a concentration of 0.1 mole.liter of benzene being in the range of 30° C. to 50° C.; and (B) 1-cyclohexyl-1-methylethyl peroxyneodecanoate;

wherein the ingredients (A) and (B) are used at a ratio by weight of 9:1 to 1:9 and being present in a total amount of 0.03 to 0.7 wt % based on the monomer or monomer mixture used.

2. A process according to claim 1, wherein said perester is a member selected from the group consisting of t-hexyl peroxyneodecanoate, t-butyl peroxyneodecanoate, t-hexyl peroxyneohexanoate, 2,4,4-trimethylpentyl peroxyneodecanoate and mixtures thereof.

3. A process according to claim 2, wherein said perester is t-hexyl peroxyneodecanoate.

4. A process according to claim 2, wherein said perester is t-butyl peroxyneodecanoate.

5. A process according to claim 2, wherein said perester is t-hexyl peroxyneohexanoate.

6. A process according to claim 1, wherein said percarbonate is a member selected from the group consisting of diisopropyl peroxydicarbonate, di-n-propyl peroxydicarbonate, di-2-ethylhexyl peroxydicarbonate, di-2-ethylhexyl peroxydicarbonate and mixtures thereof.

7. A process according to claim 1, wherein the ratio is in the range of 9:1 to 3:7.

8. A process according to claim 1, wherein the suspension polymerization is effected at a temperature of from 35° to 60° C.

* * * * *